US011012363B2

United States Patent
Meunier et al.

(10) Patent No.: US 11,012,363 B2
(45) Date of Patent: May 18, 2021

(54) CORRECTION OF AN ICMP PACKET LINKED TO AN IP PACKET HAVING BEEN PROCESSED BY AN ALG

(71) Applicant: SAGEMCOM BROADBAND SAS, Rueil Malmaison (FR)

(72) Inventors: Brice Meunier, Rueil Malmaison (FR); Fabrice Cluzeau, Rueil Malmaison (FR)

(73) Assignee: SAGEMCOM BROADBAND SAS, Rueil Malmaison (FR)

(*) Notice: Subject to any disclaimer, the term of this patent is extended or adjusted under 35 U.S.C. 154(b) by 0 days.

(21) Appl. No.: 16/954,896

(22) PCT Filed: Dec. 13, 2018

(86) PCT No.: PCT/EP2018/084668
§ 371 (c)(1),
(2) Date: Jun. 17, 2020

(87) PCT Pub. No.: WO2019/121281
PCT Pub. Date: Jun. 27, 2019

(65) Prior Publication Data
US 2020/0382434 A1    Dec. 3, 2020

(30) Foreign Application Priority Data

Dec. 19, 2017  (FR) ...................... 1762464

(51) Int. Cl.
*H04L 12/805* (2013.01)
*H04L 12/46* (2006.01)
*H04L 12/66* (2006.01)

(52) U.S. Cl.
CPC ........ *H04L 47/365* (2013.01); *H04L 12/4641* (2013.01); *H04L 12/66* (2013.01)

(58) Field of Classification Search
CPC .... H04L 47/365; H04L 12/4641; H04L 12/66
See application file for complete search history.

(56) References Cited

U.S. PATENT DOCUMENTS

| 2014/0211799 A1* | 7/2014 | Yu ......................... H04L 45/745 |
| | | 370/392 |
| 2015/0071067 A1* | 3/2015 | Martin .................. H04L 47/365 |
| | | 370/235 |

(Continued)

OTHER PUBLICATIONS

International Preliminary Report on Patentability and the Written Opinoin of the International Searching Authority as issued in International Patent Application No. PCT/EP018/084668, dated Jun. 23, 2020.

(Continued)

*Primary Examiner* — Luat Phung
(74) *Attorney, Agent, or Firm* — Pillsbury Winthrop Shaw Pittman LLP

(57) ABSTRACT

A method for correcting a packet of an Internet control message protocol (ICMP), during routing of a packet between a private and a public network having been processed by an application level gateway, includes reading a packet of an ICMP including a "need to fragment" message and the value of a maximum transmission unit defining the maximum size of data packets handled in a communication protocol used by a routing, calculating a value of a processing size by comparing a size of a packet not processed by the integrator of the application level gateway and a size of the same packet processed by the integrator, modifying the packet of an ICMP by overwriting the value of the maximum transmission unit with an actual maximum packet size value which depends on the value of the processing size, sending, to a transmitter having sent the non-processed packet, the packet of an ICMP.

9 Claims, 5 Drawing Sheets

(56) References Cited

U.S. PATENT DOCUMENTS

2015/0188833 A1    7/2015  Fusco et al.
2019/0124055 A1*   4/2019  Guo ..................... H04W 12/10

OTHER PUBLICATIONS

International Search Report as issued in International Patent Application No. PCT/EP018/084668, dated Feb. 12, 2019.

* cited by examiner

```
▼ Internet Protocol Version 4, Src: 192.168.2.10 (192.168.2.10), Dst: 172.26.26.103 (172.26.26.103)
    Version: 4
    Header length: 20 bytes
  ▶ Differentiated Services Field: 0x00 (DSCP 0x00: Default; ECN: 0x00: Not-ECT (Not ECN-Capable Transport))
    Total Length: 1485
    Identification: 0x1551 (5457)
  ▶ Flags: 0x02 (Don't Fragment)
    Fragment offset: 0
    Time to live: 64
    Protocol: UDP (17)
  ▶ Header checksum: 0x969b [validation disabled]
    Source: 192.168.2.10 (192.168.2.10)
    Destination: 172.26.26.103 (172.26.26.103)
    [Source GeoIP: Unknown]
    [Destination GeoIP: Unknown]
▶ User Datagram Protocol, Src Port: sip (5060), Dst Port: sip (5060)
▶ Session Initiation Protocol (INVITE)
```

Figure 5

```
▶ Internet Protocol Version 4, Src: 192.168.2.1 (192.168.2.1), Dst: 192.168.2.10 (192.168.2.10)
▼ Internet Control Message Protocol
    Type: 3 (Destination unreachable)
    Code: 4 (Fragmentation needed)
    Checksum: 0x3b90 [correct]
    MTU of next hop: 1492
  ▶ Internet Protocol Version 4, Src: 192.168.2.10 (192.168.2.10), Dst: 172.26.26.103 (172.26.26.103)
  ▶ User Datagram Protocol, Src Port: sip (5060), Dst Port: sip (5060)
  ▶ Session Initiation Protocol
```

Figure 6

CORRECTION OF AN ICMP PACKET LINKED TO AN IP PACKET HAVING BEEN PROCESSED BY AN ALG

CROSS-REFERENCE TO RELATED APPLICATIONS

This application is the U.S. National Stage of PCT/EP2018/084668, filed Dec. 13, 2018, which in turn claims priority to French patent application number 1762464 filed Dec. 19, 2017. The content of these applications are incorporated herein by reference in their entireties.

TECHNICAL FIELD

The present invention generally speaking relates to the routing of data in a gateway between a private network LAN (Local Area Network) and a public network WAN (Wide Area Network, as opposed to the local area network or LAN), comprising an ALG (Application Level Gateway) protocol, for the establishment of a multi-path connection between at least one computer device of a private network and a computer device or computer network devices of another public network.

More precisely, the messages comply with the ICMP (Internet Control Message Protocol). The ICMP makes it possible to manage information relative to errors detected by machines connected to the Internet network. Thus, ICMP is used by routers to report an error. ICMP error messages are transported on the network in the form of datagram, like any datum in a packet of an Internet control message protocol ICMP.

The invention more particularly relates to a method for correcting a packet of an Internet control message protocol ICMP derived from a SIP (Session Initiation Protocol) packet containing a size exceeding the maximum transmission unit (MTU) size of a router, during routing of a packet between a private network and a public network by means of an application level gateway ALG integrator.

The invention finds applications, in particular, in calls using the SIP protocol of which the packets are processed by an application level gateway ALG protocol.

TECHNOLOGICAL BACKGROUND

The ALG application level gateway protocol is a technique used in computer networks to make it possible to enhance the security of a firewall or NAT between a local network and a public network. The application level gateway ALG protocol integrator is a software component that manages protocols of specific applications such as SIP and FTP (File Transfer Protocol). Hereafter, reference will be made indifferently to "application level gateway integrator" or to "application level gateway protocol" to designate this software component. The application level gateway ALG protocol thus acts as intermediary between a public network (Internet) and a private network in a gateway which may comprise application protocols. For example, the application level gateway ALG protocol rewrites the protocol level SIP to enable translation between a private network LAN and a public network WAN. The ALG appears as the termination point before the routing of the gateway, that is to say the output of the gateway. The ALG controls the authorisation or the denial of traffic to an application of the server. It does this by intercepting and analysing a specified traffic, to enable the traffic to pass through the gateway.

When a packet is sent from an internal network to an external network, the application level gateway ALG protocol can convert information, addresses, in a network level of the packet. This can lead to problems due to the fact that the size of the packet may exceed a maximum transmission size of a host, for example a router, between a transmitter and the receiver.

It is known in the case of size of a packet exceeding a maximum transmission size MTU of a host, for example a router, to use an Internet control message protocol ICMP which is an error message, for example when a service or a host is inaccessible, sent to the transmitter. The router uses the Internet control message ICMP to transfer a packet of an Internet control message protocol ICMP to the transmitter comprising information on the maximum transmission size MTU of the host in this case of the router. A DF (Don't Fragment) flag of the outgoing packet makes it possible to discover the maximum transmission size MTU of a given path (also called "MTU discovery"). Along the path taken by such a packet, if one of the hosts or routers passed through has an MTU smaller than the size of the transmitted packet, the latter will be rejected and a packet of an Internet control message protocol ICMP, containing a MTU size of the host that generates it, will be sent in order to inform the source.

An example of this type of message is represented for example in FIG. 6 which is a copy of a part of a computer screen, in which may be read:

type 3/code 4, "Fragmentation Needed"

The value of the MTU is in a field of the packet of an Internet control message protocol ICMP: "maximum transmission size MTU of next hop": 1492 in this example.

Notably, normal MTU values for different types of network are known:

on Ethernet:
  MTU=1500 octets by default.
  MTU=1500 to 9000 octets with Jumbo frame.
on PPPoE: MTU=1492 octets.
on ADSL or ATM25: MTU=1468 octets.
on ADSL in Wi-Fi: MTU=1468 octets.

Thus, the transmitter can send a packet, for example of 1491 octets size and, if there is no error message, it can deduce therefrom that it can send at least packets of 1491 octets.

If the transmitter receives a packet of an Internet control message protocol ICMP with the information to fragment and comprising the information of a maximum transmission size MTU of a value of 1468 octets, the transmitter can either fragment to reach a size less than or equal to 1468 octets, or reduce its message to reach 1468 octets, notably when the packet cannot be fragmented.

For example, in the VoIP (Voice on IP) telephone context, a transmitter can send in the private network a packet marked "don't fragment" DF comprising in the application level 7 a SIP packet which is a SIP protocol. The SIP packet is a signaling protocol with information enabling the initialisation of multimedia sessions and may be modified by the application level gateway ALG protocol.

Indeed, during processing of the SIP packet by the application level gateway ALG protocol, the header of the SIP packet may be modified, for example an IP address or a port may be modified, information may be added to the applicative level of the SIP packet. This modification may lead to a modification of the size of the IP packet sent as described previously.

When a packet exceeds the maximum transmission size MTU of a packet being able to be transmitted in one go (without fragmentation), a routing sends back to the transmitter a packet of an Internet control message protocol ICMP comprising the "Fragmentation Needed" information as well as the maximum transmission unit MTU value.

In the case where the maximum transmission size MTU value is smaller than the size of the IP packet transmitted by the transmitter, the transmitter can either send back a packet of smaller size or can accept the fragmentation of the packet by sending back the same packet but without the DF flag.

However, due to the fact that the application level gateway ALG protocol has modified the packet, it is possible in certain cases that the maximum transmission size MTU value is greater than the size of the packet sent by the transmitter and obviously smaller than the size of the same packet processed by the application level gateway ALG protocol. The transmitter does not understand the error mentioned in the packet of an Internet control message protocol ICMP given that the size of the packet sent by the transmitter was less than the maximum transmission value.

The transmitter not understanding, the call process stops and thus fails.

An example will now be described to illustrate this problem better:

The transmitter sends a packet of 1490 octets size comprising an IP packet marked DF (don't fragment). The application level gateway ALG protocol modifies the SIP packet notably by modifying the IP LAN addresses by the IP WAN address of the gateway and can modify the port. These modifications lead to, in this example, an increase of 7 octets of the size of the packet.

The size of the packet processed by the application level gateway ALG protocol is thus 1490 octets+7 octets i.e. 1497 octets. The routing of the gateway after the application level gateway ALG protocol to pass from the private network LAN to the public network WAN may for example accept the size of 1497 octets, but one of the routings for example, in the public network, only accepts 1492 octets, that is to say that the maximum transmission size MTU value is 1492.

This routing, on account of the SIP packet marked DF, is going to send back to the transmitter of this packet a packet of an Internet control message protocol ICMP marked "fragmentation needed" with a maximum transmission size MTU value of 1492. This is going to pass the gateway of the public network to the private network then the transmitter is going to receive this packet of an Internet control message protocol ICMP containing the maximum transmission size MTU value of 1492 whereas the transmitter has sent a packet of a size of 1490 octets.

There is thus a failure of the call. This is particularly dangerous in the case of an emergency call.

There is thus a need to remedy these problems.

SUMMARY OF THE INVENTION

The invention makes it possible to resolve a problem posed by an increase in size of a packet by the application level gateway ALG protocol and wherein the added increase in size makes it exceed the maximum transmission size MTU value of a routing between the transmitter and the receiver.

The invention aims to eliminate, or at least to attenuate, all or part of the aforesaid drawbacks of the prior art.

To this end, a first aspect of the invention proposes modifying the maximum transmission size MTU value received in the packet of an Internet control message protocol ICMP by a lower value as a function of the modification of the size of the packet by the application level gateway ALG protocol.

To this end, a first aspect of the invention proposes a method for correcting a packet of an Internet control message protocol ICMP, during routing of a packet between a private network and a public network having been processed by an application level gateway ALG, comprising the steps of:
  reading a packet of an Internet control message protocol ICMP comprising a "fragmentation needed" message and a MTU (maximum transmission unit) value which defines the maximum size of data packets handled in a communication protocol used by a routing,
  calculating a value of a processing size (also called length) by comparing a size of a packet not processed by the application level gateway ALG integrator and a size of the same packet processed by the application level gateway ALG integrator,
  modifying the packet of an Internet control message protocol ICMP by overwriting the maximum transmission size MTU value with an actual maximum packet size value which is a function of the processing size value,
  sending, to a transmitter having sent the non-processed packet (12t), the modified packet of an Internet control message protocol ICM P.

This allows that the size value of the modification of a packet modified by the application level gateway ALG protocol is taken into account in the packet of an Internet control message protocol ICMP.

It follows that at the following test, the transmitter will modify its packet to have a size less than the actual maximum transmission size MTU value corresponding to a maximum transmission size MTU value when the packet is modified. The modification may for example, in the case of a call by the SIP protocol, be carried out by deleting a coder/decoder in the message part.

According to an embodiment, the method for correcting a packet of an Internet control message protocol ICMP, further comprising a step of:
  calculating the value of the actual maximum transmission size by subtracting the calculated value of the processing size from the value of the maximum transmission unit of the packet of an Internet control message protocol ICMP.

This embodiment allows that the packet size that the transmitter can send is the maximum size before processing. The transmitter may thus delete a message such as a not very useful coder/decoder, having a size corresponding at least to the actual maximum transmission size subtracted from the size of the packet sent previously.

According to an embodiment which can be combined with the embodiment described previously, the method for correcting a packet of an Internet control message protocol further comprises a step of:
  measuring the size of the non-processed packet,
  memorising the size of the non-processed packet,
  measuring the size of the packet processed by the application level gateway ALG integrator,
  memorising the calculated value of the processing size.

According to an embodiment, the method comprises a step of sending a packet of an Internet control message protocol ICMP comprising the actual maximum transmission size MTU value if the size of the processed packet is greater than a predetermined size, for example 1500 octets.

This makes it possible to send the actual maximum transmission size value directly. The predetermined size being able to be updated in the case where a known new maximum transmission size MTU is greater than this predetermined size.

A second aspect of the invention also relates to a method for processing a packet between a private network and a public network comprising the method for correcting a packet of an Internet control message protocol ICMP described previously or one or more of the embodiments described previously. This method further comprises a step of:
   receiving a packet, marked "don't fragment", not processed by an application level gateway ALG integrator,
   transforming the packet not processed by the application level gateway ALG integrator into a processed packet.

According to an embodiment of the method for processing a packet between a private network and a public network, the method further comprises a step:
   of sending the processed packet to the recipient on a public network if the size of the processed packet is not greater than a size of maximum transmission unit (MTU) value of the routing of the gateway.

This embodiment makes it possible to send on the public network the packet uniquely if the value of the size of the packet sent is smaller than the maximum transmission size MTU of the gateway.

According to an embodiment of the method for processing a packet between a private network and a public network which can be combined with the preceding embodiment, the method further comprises a step of:
   generating a packet of an Internet control message protocol ICMP if the size of the processed packet is greater than a size of maximum transmission unit MTU value, and wherein the step of modifying the packet of an Internet control message protocol is carried out.

This makes it possible to modify directly in the routing of the gateway of the application level gateway ALG protocol for sending the actual maximum transmission size.

According to an embodiment of the method for processing a packet between a private network and a public network which can be combined with the preceding embodiments, the packet of the message is an IPV4 or IPV6 packet.

According to an embodiment of the method for processing a packet between a private network and a public network which can be combined with the preceding embodiments, the application level of the message sent is a SIP signaling protocol.

This makes it possible to transmit a call while passing through an application level gateway ALG protocol.

According to an example of this embodiment, the SIP packet contains an INVITE or BYE request.

According to an embodiment of the method for processing a packet between a private network and a public network, which can be combined with the preceding embodiments, the application level of the message is a file transfer protocol FTP.

A third aspect of the invention also relates to an application level gateway ALG protocol integrator comprising the correction method described previously with or without one or more of the embodiments described previously.

A fourth aspect of the invention also relates to a "computer software" product comprising the application level gateway ALG integrator according to the third aspect of the invention.

A fifth aspect of the invention also relates to a router comprising the "computer software" product comprising the application level gateway ALG integrator according to the fourth aspect of the invention.

A sixth aspect of the invention also relates to a private network LAN comprising a router according to the fifth aspect of the invention and at least one device able to send a packet to the router, notably a SIP packet comprising an INVITE request.

A seventh aspect of the invention also relates to a device of an application level gateway ALG enabling communication between a private network and a public network, wherein the gateway device comprises:
   a private data input configured to receive data from a private network LAN,
   a public data input configured to receive data from a public network WAN,
   a data memory making it possible to memorise data,
   a programme memory comprising:
      i) a programme for reading a packet of an Internet control message protocol ICMP comprising a "fragmentation needed" message and a maximum transmission unit (MTU) value which defines the maximum size of data packets in a communication protocol used by a routing,
      ii) a programme for calculating a processing size value by comparing the size of a packet not processed by the application level gateway ALG integrator and the size of the same packet processed by the application level gateway ALG integrator,
      iii) a writing programme to modify the packet of an Internet control message protocol ICMP by overwriting the maximum transmission unit value with an actual maximum packet size value which is a function of the processing size value,
      iv) a programme for sending, to a transmitter having sent the non-processed packet in the private input, the modified packet of an Internet control message protocol (ICMP).

According to an embodiment, the application level gateway device is a router.

An eighth aspect of the invention also relates to a "computer programme" product directly loadable in the internal memory of a digital computer, comprising software code portions which, when said programme is executed by a computer, lead said computer to implement all the steps of the correction method or processing method described previously without or with the different embodiments described.

A ninth aspect of the invention also relates to a data recording support readable by a machine comprising a processor, comprising the computer programme described previously.

BRIEF DESCRIPTION OF THE DRAWINGS

Other characteristics and advantages of the invention will become clearer on reading the description that follows. This is purely illustrative and should be read with regard to the appended drawings in which:

FIG. 5 shows a portion of a printed screen illustrating an example of IP packet not to fragment containing a SIP protocol;

FIG. 6 shows a portion of a printed screen illustrating a packet of an Internet control message protocol ICMP.

DETAILED DESCRIPTION OF EMBODIMENTS

Figure 1:
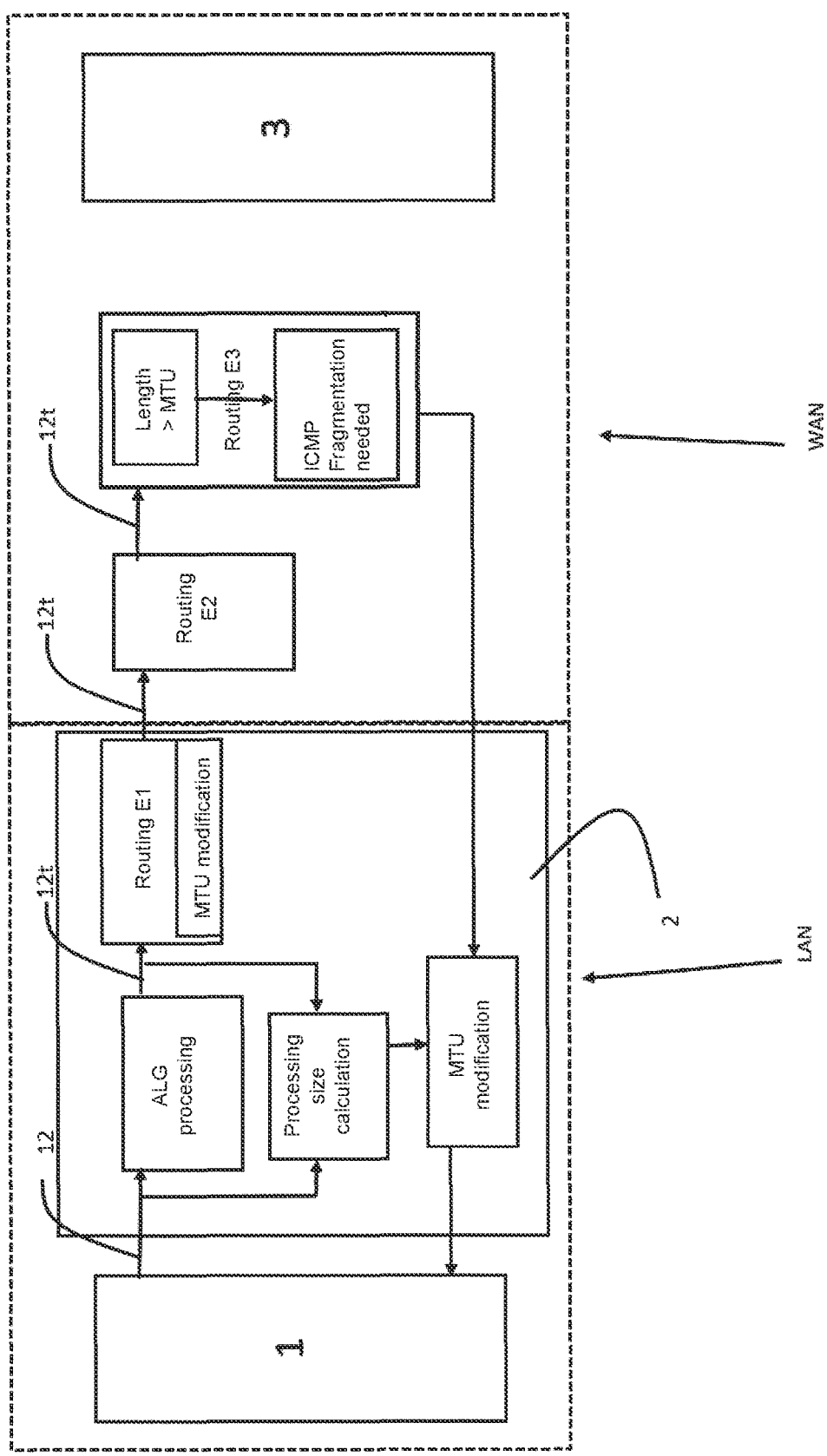
FIG. 1 is a block diagram showing an example of sending a packet having a size greater than the maximum transmission size MTU value of a WAN routing and implementing the correction of the maximum transmission size MTU value in a packet of an Internet control message protocol ICMP.

In the description of embodiments that follows and in the appended figures of the drawings, the same elements or similar elements bear the same references in the drawings.

As has been set out in the introduction, different level 7 applications may be modified by the application level gateway ALG protocol, notably the FTP and the SIP.

The invention will be described as an example with the sending of a SIP packet.

The SIP protocol has numerous applications such as VoIP calls, video telephony, instantaneous messaging, virtual reality or even on-line video games. SIP shares numerous similarities with the HTTP protocol such as ASCII coding and response codes.

Information is found in the header such as:
the IP address of the source
the IP address of the destination
the type of message (INVITE, ACK, OK, BYE, etc.)
the type of message content (often SDP)
etc.

The invention will be described in particular for a VoIP call by the SIP protocol.

The transmitter, also called client, sends requests to the server which sends it back a response. The basic requests are:
INVITE allows a client to request a new session,
ACK confirms the establishment of the session,
CANCEL cancels a pending INVITE,
BYE terminates a session underway,
OPTIONS makes it possible to recover user management capabilities, without opening a session,
REGISTER makes it possible to register with a registration server.

The invention will be described with an example of SIP packet INVITE hereafter but obviously is only given as an example.

FIG. 1 shows an example of sending the SIP packet INVITE.

FIG. 5 shows an example of IP packet using the SIP protocol comprising an INVITE request. The SIP packet sent by the transmitter may comprise for example, for an IPv4, as indicator the Flag field bit 1 which says bit DF (Don't Fragment) (conversely, if it is positioned at 0, fragmentation is allowed). In the example described below, bit 1 of the Flag field is positioned at 1 and thus fragmentation is prohibited. The IP packet of FIG. 5 comprises the indication DF: don't fragment.

The IP packet of FIG. 5 shows that its "Total length" size is 1485 octets.

The transmitter 1, which is for example an IP telephone, is in a private network LAN and sends a SIP protocol packet 12 labeled DF having an INVITE request in a private data input configured to receive data from a private network LAN, of a router 2. The router 2 is a device which serves as gateway between a private network LAN and a public network WAN. The router 2 thus comprises a public data input configured to receive data from a private network WAN. Input is taken to mean data that can enter or exit the router 2.

Figure 4:
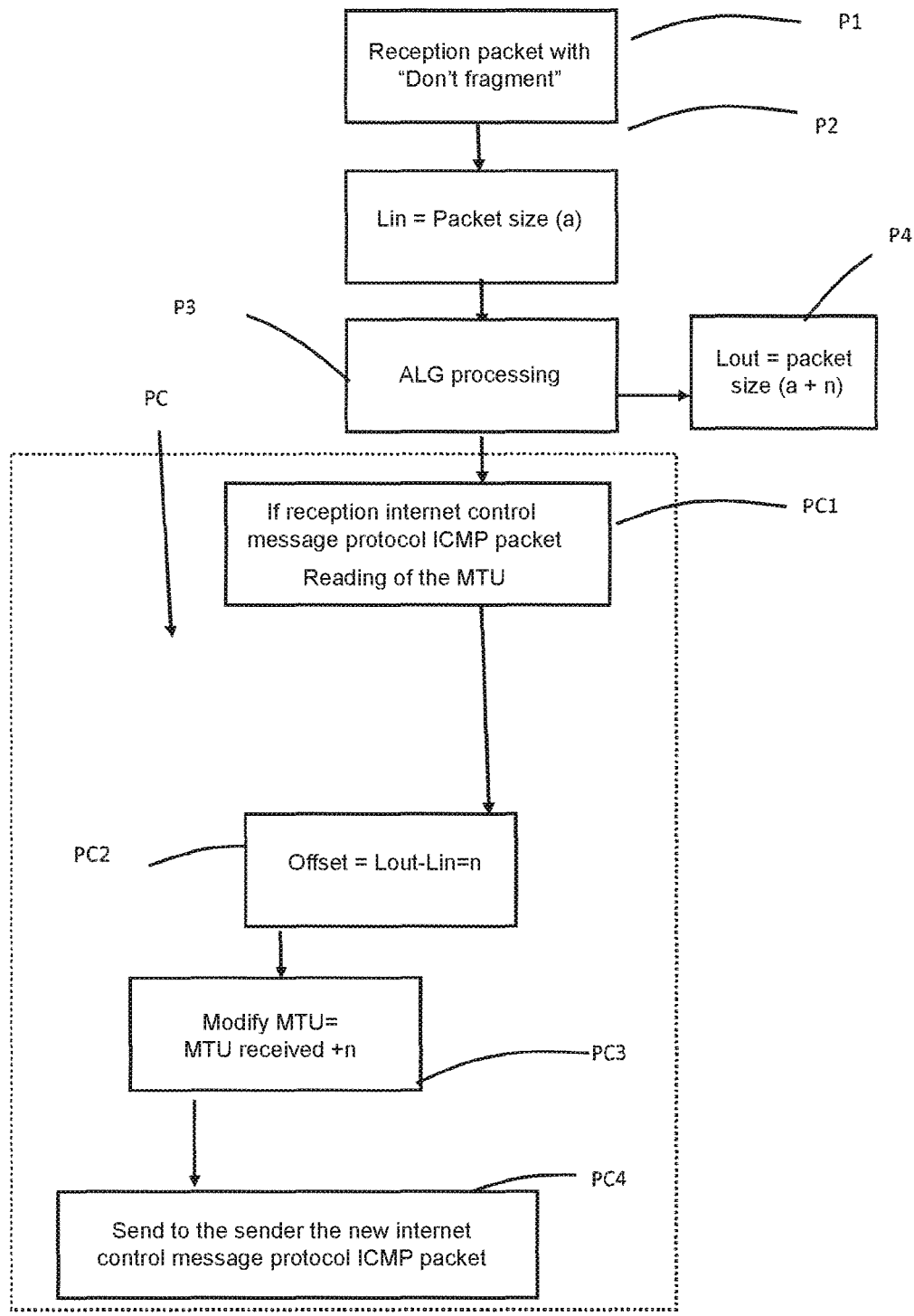
FIG. 4 is a diagram of steps which illustrate an embodiment of the method for correcting the value of the maximum transmission size MTU.

FIG. 4 shows a step diagram of the router 2 showing a step P1 of receiving this packet 12. The packet 12 is destined for a receiver 3 being for example a computer. The router 2 carries out a step P2 visible in FIG. 4 which memorises the value Lin of the size of the packet 12, which is in this case 1485 octets, in a data memory making it possible to memorise data.

The router 2 comprises a programme memory comprising an application level gateway ALG protocol to adapt the packet 12 originating from the private network LAN to a public network WAN. The router thus carries out a step P3 of application level gateway ALG protocol processing of the packet 12 which leads to modifications of the application level SIP, notably the occurrences of the IP LAN address which are replaced by another IP WAN address as well as in this example the modification of a port. The packet 12 then becomes a processed packet 12t. The modifications have increased the size Lin of the packet 12, which passes from 1485 to the size Lout of the processed packet 12t, 1495 octets in this example.

The router 2 carries out a step P4 which memorises the size Lout of the processed packet 12t in the data memory. The router 2 next comprises a routing E1 which in this case verifies the maximum transmission size MTU value which is 1500 octets and compares it with the size of the packet 12t.

The packet 12t is next transferred into the public network through which it is going to pass through several routings, notably the routing E3. The routing E3 also verifies the size of the packet 12t with respect to its maximum transmission size MTU value, which in this case is 1492 octets.

The size of the packet 12t being larger than the maximum transmission size of the routing E3, the routing E3 sends in the direction of the telephone 1 a packet of an Internet control message protocol ICMP. FIG. 6 shows an example of packet of an Internet control message protocol ICMP to be retransmitted to the transmitter 1. In this packet of an Internet control message protocol ICMP, it is possible to see a field "MTU next hop" of which the value is 1492, corresponding to the maximum transmission size MTU of this routing E3.

The packet of an Internet control message protocol passes through the same routers through which the processed packet 12t is passed and notably passes through the router 2 to pass from the public network WAN to the private network LAN.

The router 2 having received the packet of an Internet control message protocol ICMP, and having memorised the value of the size of the packet 12 and of the same processed packet 12t, may carry out a method for correcting a packet of an Internet control message protocol ICMP.

An example of this correction method PC is represented in the block diagram in FIG. 4. In this example, the modification of a maximum transmission size MTU value in the packet of an Internet control message protocol ICMP is carried out as soon as a packet of an Internet control message protocol ICMP is received in the router and when the original IP packet has been processed by an application level gateway ALG protocol. The router 2 thus comprises a programme memory for carrying out this correction method. The correction method comprises a first step PC1 of receiving a packet of an Internet control message protocol ICMP and of reading in the packet an Internet control message protocol ICMP of a maximum transmission unit (MTU) value which defines the maximum size of data packets handled in the routing E3.

The correction method, in this embodiment, further comprises a step of calculating PC2 a value of the processing size by comparing the length of a packet not processed by the application level gateway ALG integrator and the size of the packet processed by the application level gateway ALG protocol. In this case, the value of the size of the non-processed packet 12 was 1485 and the size of the processed packet was 1495 i.e. a processing size value of 10.

The correction method further comprises a step of modification PC3 of the packet of an Internet control message protocol by overwriting the maximum transmission unit value with an actual maximum packet size value which is a function of the processing size value.

In this case, the modification step PC3 comprises a subtraction of the calculated value of the processing size which was equal to 10 from the value of the "MTU of next hop" field which was 1492 of the packet of an Internet control message protocol ICMP. Thus the actual maximum packet size value in the field "maximum transmission size MTU of next hop" is 1482 of the modified packet of an Internet control message protocol ICMP.

Finally, the correction method comprises a step of sending to the transmitter the modified packet of an Internet control message protocol ICMP, wherein the maximum transmission size field "MTU of next hop" is 1482 and not 1492.

It follows that the transmitter 1 comprises the error due to the fact that its packet was 1485 and modifies it for example by deleting a coder/decoder then sends back its packet 12m with the SIP protocol and the INVITE request comprising a size smaller than 1482 octets, for example 1480 octets.

Figure 3:
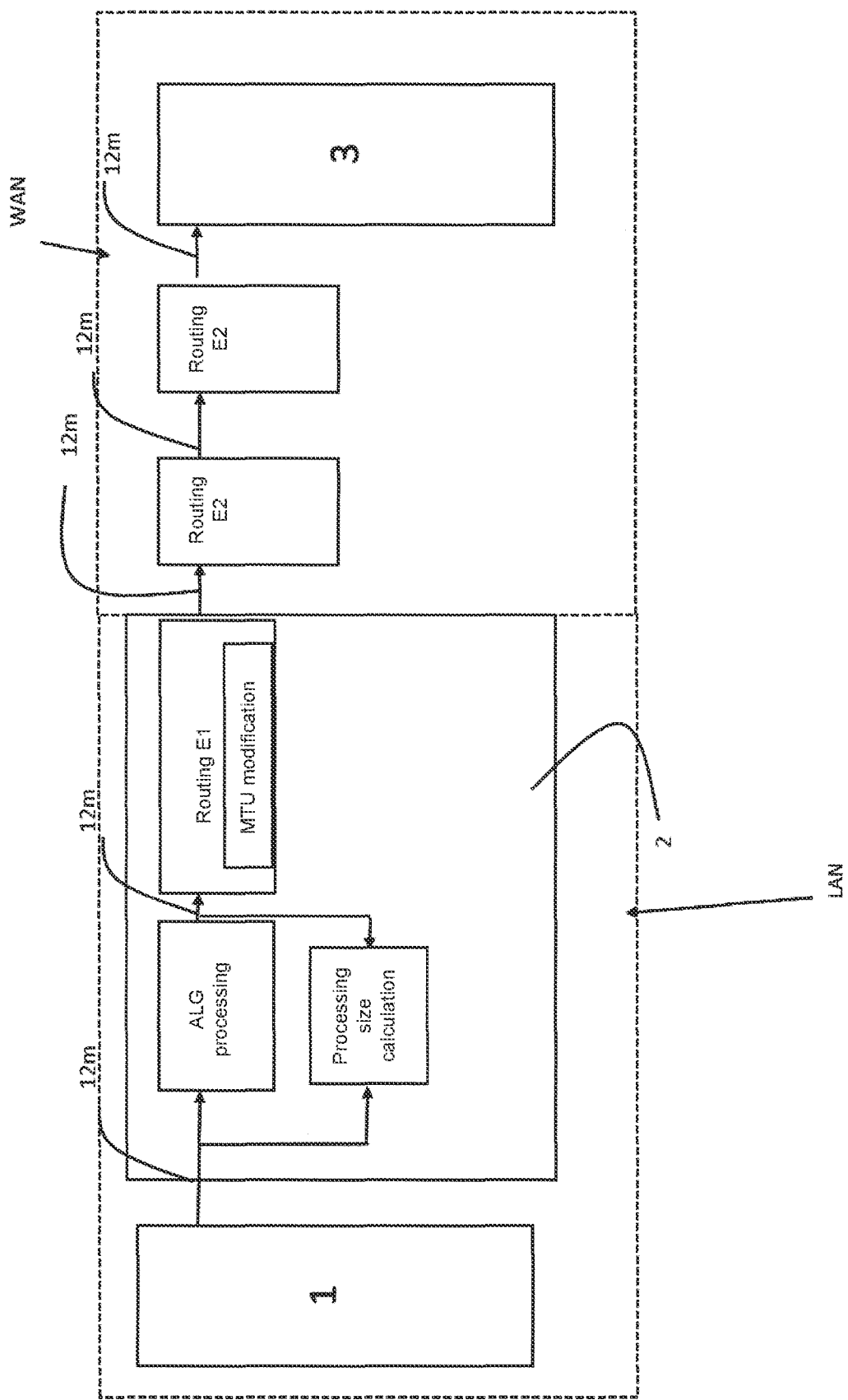
FIG. 3 is a diagram showing the case where the transmitter has modified its packet after the case of FIG. 1 or 2.

FIG. 3 is a diagram showing the case where the transmitter has modified its packet after the case of FIG. 1. The packet 12m is processed by the application level gateway ALG protocol. A packet 12m t comes out of the application level gateway ALG protocol with a size of 1490 octets for example, then passes through different routings E1, E2 E3, En up to arriving at the receiver 3.

Obviously, another routing, for example E4 not represented, may have a maximum transmission size MTU less than 1492, for example 1468 octets. In this case, if the IP packet still comprises a DF (Don't Fragment) flag, the Internet control message protocol ICMP method begins again, since the size of the new packet 12m t is larger than the maximum transmission size MTU of the routing E4. A new packet of an Internet control message protocol ICMP is thus sent from the routing E4 to the router 2, comprising a maximum transmission size "MTU next hop" field of 1468 octets. The router 2 thus carries out the calculation step PC2. In this case, the value of the size of the non-processed packet 12 was 1480 and the size of the processed packet was 1490 to pass to the final maximum transmission size MTU value of 1492, i.e. still the processing size value of 10. The router 2 then carries out the modification of the maximum transmission size MTU by replacing 1468 by 1458 (1468–10).

It follows that the router carries out the step of sending PC5 to the transmitter 1 the packet of an Internet control message protocol ICMP comprising the maximum transmission size MTU value of 1458 in the field "MTU next hop".

It follows that at each reception of a packet of an Internet control message protocol ICMP coming from an IP packet having been modified by the application level gateway ALG protocol, the calculation step PC2 and the modification step PC3 and finally the step of sending the modified packet of an Internet control message protocol ICMP PC4 are carried out. Thus, in the case of an Internet control message protocol ICMP coming from a packet modified by the ALG, the transmitter IP still receives a modified packet of an Internet control message protocol ICMP. This has the advantage of avoiding a second packet of an Internet control message protocol ICMP by the same host (router) since the processing is taken into account as of the first time.

Figure 2:
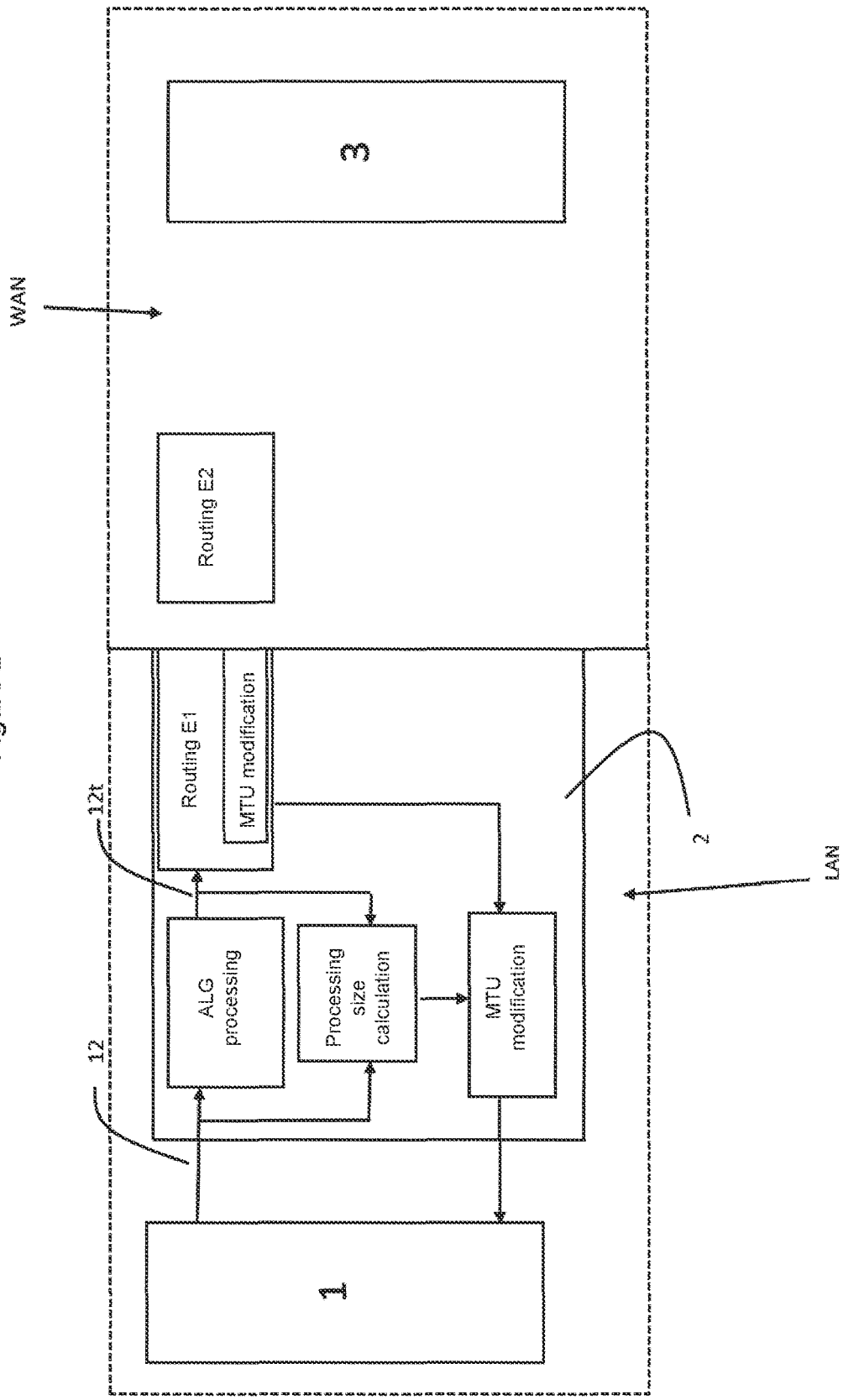
FIG. 2 is a block diagram showing an example of sending a packet having a size greater than the maximum transmission size MTU value of a LAN-WAN routing and implementing the correction of the maximum transmission size MTU value in a packet of an Internet control message protocol ICMP.

The router 2 may also, following the modification of the packet 12 sent by the transmitter 1 by the application level gateway ALG protocol, send to the transmitter 1 a packet of an Internet control message protocol ICMP if the size of the modified packet is greater than its maximum transmission size MTU. FIG. 2 represents a block diagram showing the router realising the application level gateway ALG protocol and the packet of an Internet control message protocol ICMP.

The transmitter 1 thus sends from a private network an IP packet 12 for a call by VoIP using the SIP protocol to a receiver 3 while passing through a LAN network, as in the example of FIG. 1. The receiver 3 may also be in another private network LAN but accessible uniquely by a public network WAN.

In this example of call, the packet 12 which has a size Lin for example of 1491 octets, has its size value memorised as in the example of FIG. 1 in a data memory then the packet 12 is modified by the application level gateway ALG protocol to become a processed packet 12t containing 1501 octets. The router 2 memorises, as in the example of FIG. 1, the size Lout of the processed packet 12t in a data memory.

The router 2 performs a calculation of a value (n) of the processing size by comparing the size Lin of the packet 12 and the size Lout of the packet 12t. The router memorises in this example the value n in a structure "sk_buff" of the IP packet. The LAN-WAN routing 1 verifies the size Lout of the packet 12t of 1501 octets with respect to its maximum transmission size MTU of 1500 octets. The packet 12t being a SIP packet marked "don't fragment" DF, the router 2 sends in the direction of the transmitter 1 a packet of an Internet control message protocol ICMP containing a maximum transmission size MTU value as a function of the value n memorised in the IP packet.

In this case, the programme memory comprises a writing programme for modifying the packet of an Internet control message protocol ICMP by overwriting the maximum transmission unit value with an actual maximum packet size value which is the maximum transmission size MTU value of the router i.e. 1500 subtracted from the processing value n which is 10.

The programme memory further comprises a programme for sending to one of the private inputs or output having received from a transmitter of the message the modified packet of an Internet control message protocol ICMP.

According to another example the maximum transmission size MTU value is modified by the maximum transmission size MTU value received subtracted from the sum of the value of the processing size calculated at step PC2 and of a predetermined safety margin value. The safety margin may for example be equal to 1 octet.

The present invention has been described and illustrated in the present detailed description and in the appended figures of the drawings, in possible embodiments. The present invention is not limited, however, to the embodiments described. Other alternatives and embodiments may be deduced and implemented by those skilled in the art on reading the present description and the appended drawings.

In the claims, the term "comprises" does not exclude other elements or other steps. A single processor or several other units may be used to implement the invention. The different characteristics described and/or claimed may advantageously be combined. Their presence in the description or in different dependent claims does not exclude this possibility. The reference signs cannot in any way be understood as limiting the scope of the invention.

The invention claimed is:

1. A method for correcting a packet of an Internet control message protocol, during routing of a packet between a private network and a public network having been processed by an application level gateway integrator, comprising:
reading a packet of an Internet control message protocol comprising a fragmentation needed message and a maximum transmission unit value which defines a maximum size of data packets handled in a communication protocol used by a routing,
calculating a value of a processing size by comparing a size of a packet not processed by the application level gateway integrator and a size of the same processed packet after processing by the application level gateway integrator,
modifying the packet of an Internet control message protocol by overwriting the maximum transmission unit value with an actual maximum packet size value which is a function of the processing size value,
sending, to a transmitter having sent the non-processed packet, the modified packet of an Internet control message protocol.

2. The method for correcting a packet of an Internet control message protocol, according to claim 1 further comprising:
calculating the actual maximum packet size value by subtracting the calculated value of the processing size from the maximum transmission unit value of the packet of an Internet control message protocol.

3. The method for correcting a packet of an Internet control message protocol, according to claim 1 further comprising:
measuring the size of the non-processed packet,
memorising the size of the non-processed packet,
measuring the size of the same packet after processing by the application level gateway integrator,
memorising the calculated value of the processing size.

4. The method for processing a packet between a private network and a public network comprising the method for correcting a packet of an Internet control message protocol according to claim 1, further comprising:
receiving a packet, marked "don't fragment", not processed by the application level gateway integrator,
transforming the non-processed packet into a processed packet after processing by the application level gateway integrator.

5. The method for processing a packet between a private network and a public network according to claim 4, further comprising:
generating a packet of an Internet control message protocol if the size of the processed packet is larger than a size of maximum transmission unit value, and wherein the modifying of the packet of an Internet control message protocol is carried out.

6. The method for processing a packet between a private network and a public network according to claim 4, wherein the application level of the message is a signalling protocol.

7. A gateway comprising an application level enabling communication between a private network and a public network, wherein the gateway device comprises:
a private data input configured to received data from a private network,
a public data input configured to received data from a public network,
a data memory configured to memorise data,
a programme memory comprising:
i) a programme for reading a packet of an Internet control message protocol comprising a fragmentation needed message and a maximum transmission unit value, which defines the maximum size of data packets handled in a communication protocol used by a routing,
ii) a programme for calculating a value of the processing size by comparing the size of a packet not processed by the application level gateway ALG integrator and the size of the packet processed by the application level gateway ALG integrator,
iii) a writing programme for modifying the packet of an Internet control message protocol by overwriting the maximum transmission unit value with an actual maximum packet size value which is a function of the value of the processing size,
iv) a programme for sending, to a transmitter having sent the non-processed packet in the private input, the modified packet of an Internet control message protocol.

8. A computer programme product directly loadable in the internal memory of a digital computer, comprising software code portions which, when said programme is executed by a computer, lead said computer to implement all the steps of the method according to claim 1.

9. A non-transitory recordable support readable by a machine comprising a processor, comprising the computer programme according to claim 8.

* * * * *